INVENTOR.
ARTHUR B. EUGA
BY
Schmieding and Fultz
ATTORNEYS

INVENTOR.
ARTHUR B. EUGA

INVENTOR.
ARTHUR B. EUGA

United States Patent Office 3,266,849
Patented August 16, 1966

3,266,849
BRAKE SYSTEM FOR VEHICLES
Arthur B. Euga, 728½ Franklin Ave., Columbus, Ohio
Original application June 18, 1958, Ser. No. 744,038, now Patent No. 3,010,767. Divided and this application Nov. 21, 1961, Ser. No. 179,264
11 Claims. (Cl. 303—13)

This is a division of application Serial No. 744,038, filed June 18, 1958, now Patent No. 3,010,767. This invention relates to improvements in braking systems for motor vehicles and more particularly to auxiliary braking systems which are actuable upon failure of the usual service braking means.

This application is a continuation-in-part of my co-pending application Serial Number 564,314 filed February 8, 1956, which is a continuation-in-part of co-pending application Serial Number 176,785 filed July 31, 1950, now abandoned.

Modern vehicles are equipped with a fluid actuated service braking system and a so-called parking or emergency braking system. Such a service system, unfortunately, is subject to complete failure upon loss of its operating fluid, as of a broken line or connection in a necessarily closed and sealed system.

One object of the invention, therefore, is the provision of a means for instantly actuating the emergency braking means upon failure of the service braking means, without any action additional to that required in operating the service braking means.

Another object of the invention, therefore, is the provision of a novel means adaptable for instantly supplementing the fluid action of the service braking means upon partial loss of the serving fluid therefore without any action additional to that required in operating the service braking means.

It is another object of the present invention to provide a novel controller or transfer sleeve for disconnecting a fluid actuated brake motor from a service air supply of a service brake system and for connecting said motor to an auxiliary air supply of an auxiliary brake system.

It is still another object of the present invention to provide a novel pressure regulator valve means for connection between a service air supply of a service brake system and an auxiliary air supply of an auxiliary brake system.

It is still another object of the present invention to provide a novel controller or transfer for use with trailer air brake systems which include a relay emergency valve, said transfer sleeve being adapted to over-ride and terminate a relay emergency operation of said relay emergency valve.

Further objects and advantages of the present invention will be apparent from the following description, reference being had to the accompanying drawings wherein preferred forms of embodiments of the invention are clearly shown.

Figure 1:
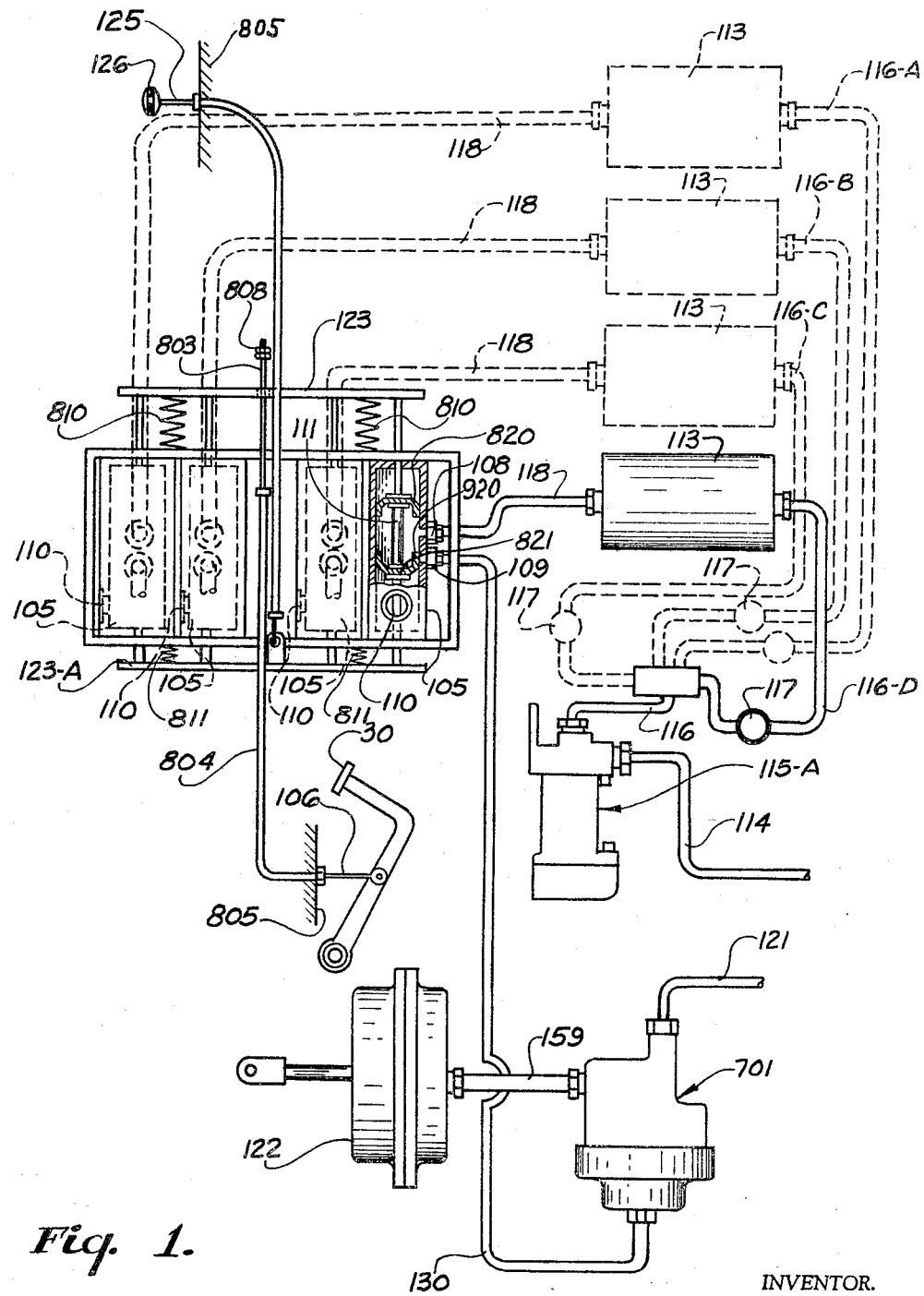
FIGURE 1 is a diagrammatic view of an auxiliary brake system constructed according to the present invention, and adapted for use with the service brake system of FIGURE 2.
Figure 2:
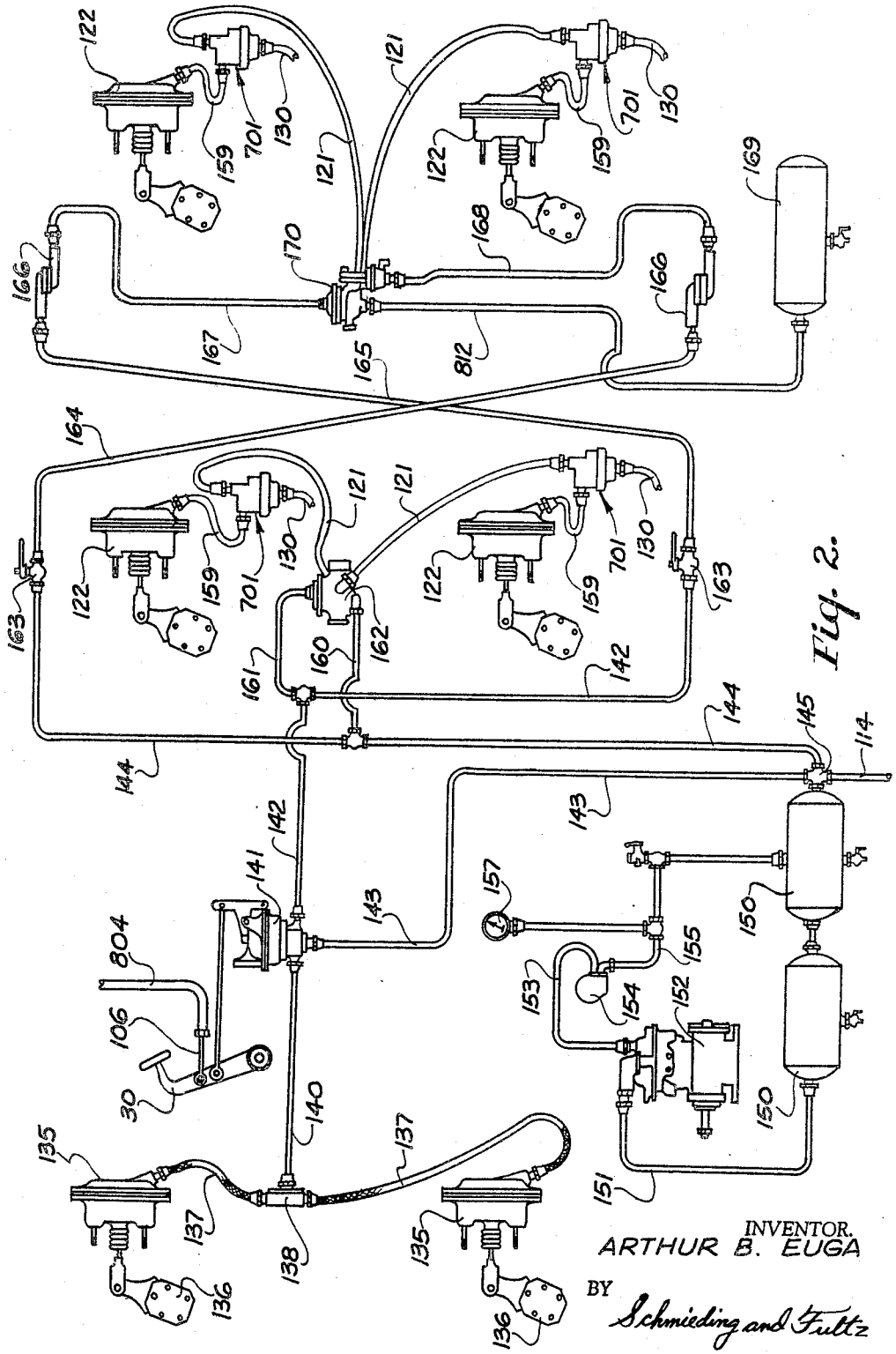
FIGURE 2 is a diagrammatic view of a service brake system adapted for use with the auxiliary brake system of FIG. 1.
Figure 3:
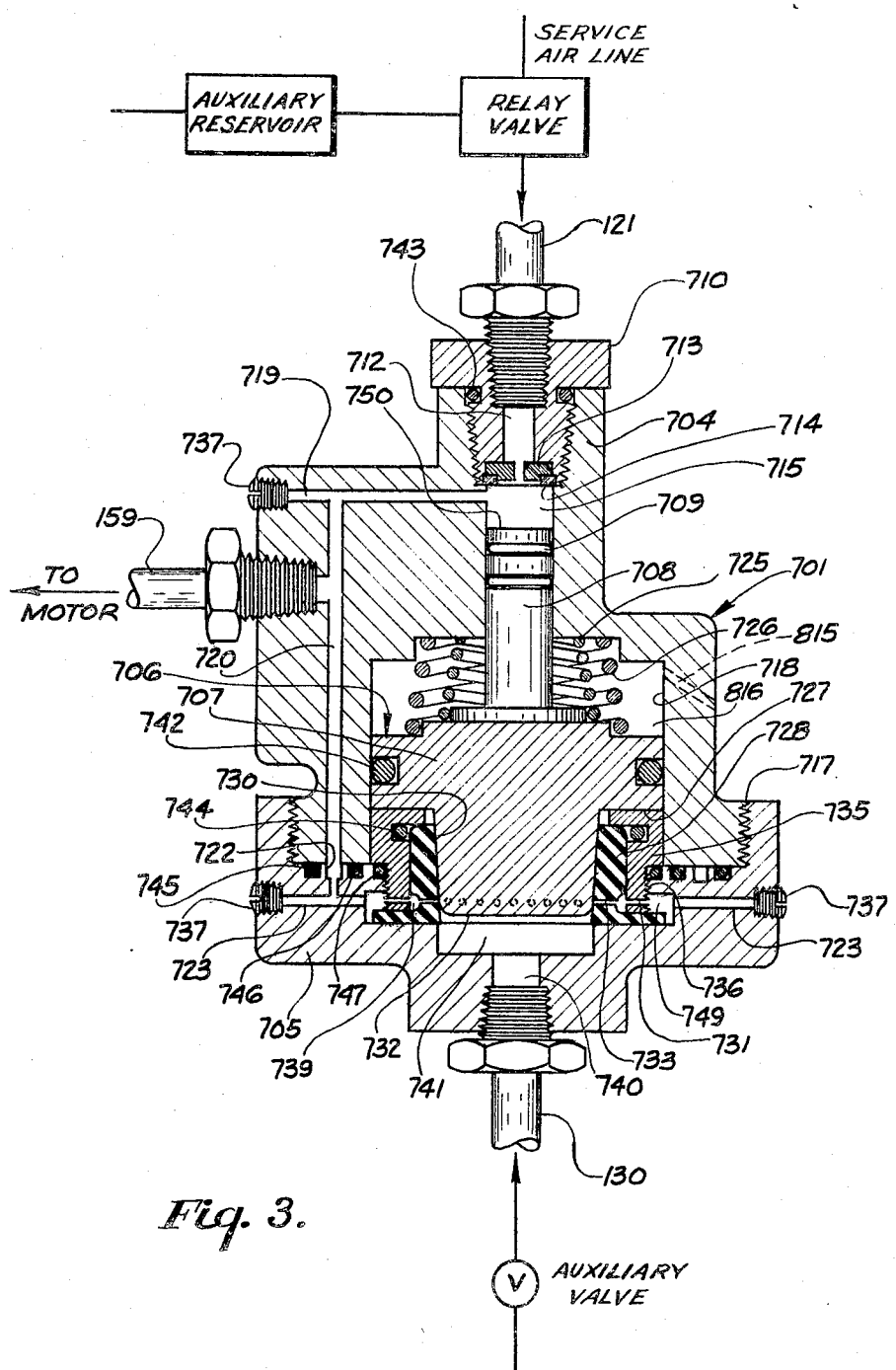
FIG. 3 is a side sectional view of a novel controller or transfer sleeve constructed according to the present invention and comprising a component of the air brake system of FIGS. 1 and 2 and the air brake system of FIG. 4.

Refering in detail to the drawings, FIGS. 1, 2, and 3 illustrate a brake system constructed in accordance with the present invention that includes four transfer sleeves 701, each of which is connected to a chamber of a respective fluid actuated brake motor 122. Each of the transfer sleeves 701 normally receives service air from a service line 121. Upon failure of any portion of the service air system of FIG. 2, transfer sleeve 701 automatically isolates brake motor 122 from the source of service air 150 or 169 and, transfer sleeve 701 serves the further function of automatically connecting its respective brake motor 122 with an auxiliary air supply 113.

Reference is next made to FIG. 3 which illustrates, in detail, the interior structure of the transfer sleeve 701. This transfer sleeve includes an upper casing portion 704 secured to a lower casing portion 705 at a threaded junction 717. Service air intake line 121 is secured to upper casing portion 704 by means of a removable plug 710. Removable plug 710 includes a passage 712 that connects a cylinder 715 with service air line 121. A piston means indicated generally at 706 includes an upper piston 708 slideably carried in cylinder 715 and a lower piston 707 slideably carried in a lower cylinder 718.

The lower end of lower piston 707 normally closes a plurality of radially disposed passages 733 formed in a sealing cup 728 which is preferably resilient and formed of synthetic rubber or the like. It will be noted that the lower end of lower piston 707 includes a tapered outer surface which conforms with a tapered inner surface of sealing cup 728 at a junction 730.

Sealing cup 728 is mounted in lower casing portion 705 by means of an annular cup retainer 735 which includes a plurality of radially extending passages 731 which communicate with radially extending passages 733 via annular passage 739. The outer ends of radial passages 731 communicate with the source of service air via annular passage 749 in lower casing portion 705, passage 720, passage 719, passage 712, and line 121.

A pair of oppositely wound compression springs 725 and 726 are disposed between upper casing portion 704 and piston means 706 for normally urging piston means 706 in the illustrated position wherein the lower end of lower piston portion 707 closes radial passage 733 and thereby isolates line 159 leading to brake motor 122 from auxiliary air supply line 130.

In operation of the system of FIGURES 1 through 3, when failure occurs in the service air system, FIGURE 2, the driver will depress service brake lever 30 to a point beyond that normally required to actuate the service brake system of FIGURE 2. This takes up the lost motion length 803, FIGURE 1, in cable 106, it being noted that cable 106 includes a sheath 804 anchored to the frame 805 of the vehicle. When the lost motion length 803 is taken up, flange 808 on the upper end of cable 106 engages member 123 and moves said member downwardly against the upwardly exerted force of compression spring 810. Air control means 105 is thereby opened by placing ports 108 and 109 in communication with one another. This releases auxiliary air from auxiliary reservoir 113 through lines 118, ports 108 and 109 of air control means 105, and lines 130 leading to lower cylinders 741, FIGURE 3, in transfer sleeves 701.

As best seen in FIGURE 3, when lower cylinder 741 of transfer sleeves 701 is pressurized, a force is exerted on surface 732 on lower piston 707. This overcomes the force exerted by compression springs 725 and 726 and forces lower piston 707 upwardly whereby radial passages 733 in sealing cup 728 are uncovered. Pressurized auxiliary air is then released through radial passage 733, annular rings 739, radial passage 731, annular passage 749, passage 723, passage 720, and line 159 leading to the chamber of brake motor 122, FIG. 1 or 2.

It should be pointed out, FIG. 3, that the upper surface 750 of upper piston 708 is of relatively small cross sectional area as compared to the combined areas 732 and 727 on lower piston 707. It will be understood that this area differential permits a relatively small auxiliary fluid pressure, in lower cylinder 741, to overcome a relatively high service fluid pressure in upper cylinder 715.

The above described pressure leverage advantage is particularly important in instances where relay emergency valve 170 has been actuated into an emergency operation by drop in the fluid pressure of the service system of FIG. 2. Such emergency operation is described in detail in my co-pending application Serial No. 701,935 filed December 10, 1957. In general, this relay emergency operation occurs at some predetermined service air pressure setting, for example, 50 p.s.i. It should be pointed out that line 168, FIG. 2, is normally pressurized at all times at the existing pressure of tractor service reservoir 150. Prior to the present invention, the event the pressure in the tractor service air system drops below the above mentioned setting, as would be caused by failure of any of the lines 144, 164, 168, or coupling 166, then relay emergency valve 170 immediately institutes a relay emergency operation. The full tank pressure of trailer service reservoir 169 is then released by relay emergency valve 170 through lines 121 to the upper cylinders 715, FIG. 3, of transfer sleeves 701.

It should be pointed out that when a relay emergency operation occurs the pressure in trailer service reservoir 169 may be relatively high, for example, 90 p.s.i., even though the tractor service air pressure has fallen below the previously mentioned predetermined pressure of 50 p.s.i. Such high pressure emergency release will of course instantly lock the brakes.

It is therefore extremely desirable, from the standpoint of safety, to over-ride a relay emergency operation in instances where the trailer has not broken away from the tractor to prevent instantaneous locking of the trailer wheels. Prior to the present invention, such instances of instantaneous locking of the trailer wheels have often resulted in so-called "dynamite stops" which many times have caused uncontrolled jack-knifing of the trailer or forward shifting of heavy loads, either of which is unusually disastrous to both the driver and vehicle.

To avoid such violent actuation of the relay emergency valve 170, in instances where the trailer has not broken away from the tractor, the driver need only actuate the auxiliary fluid system of FIGURE 1 in the manner previously described, whereby the release of auxiliary air to cylinder 741 moves piston 708 rapidly upwardly into sealed contacting engagement with resilient annular seal 714. This results in the instantaneous termination of the flow of high pressure air from trailer service reservoir 169 whereby the undesired relay emergency operation is over-ridden. Upon the termination of the relay emergency operation, line 159 leading to brake motor 122 is placed in communication with auxiliary air supply line 130, in the manner previously described, whereby the pressure in the air chamber of brake motor 122 is equalized with the pressure being released from auxiliary reservoir 113.

It should be pointed out that a vent 815 is formed through the wall of upper casing 704 to prevent the pressurization of chamber 816 and provides for free action of piston means 706.

With reference to FIG. 1 it should be pointed out that valve means 105 includes oppositely facing resilient cups 820 and 821 which are pressure balanced such that valve means 105 is insensitive to variations in the pressure existing in between oppositely facing flexible cups 820 and 821. As seen in FIG. 1 valve return compression springs 810 and 811 bias valve means 105 towards the illustrated normal position of the valve when no forces are being applied to pedal 30 or vent control knob 126. It will be understood that lips 920 of cups 821 will cover ports 109 when moveable valve elements 111 are in the normal position illustrated in FIG. 1. It will be understood that the driver can release air at controlled, metered, rates of flow and can decrease or increase the rate of flow of auxiliary air by merely pressing or releasing pedal 30. Hence, a gradual application of the brakes can be made by operation of the auxiliary air control means 105 of FIG. 1 and, moveover, any applied braking pressure can be maintained by releasing pedal 30 whereby valve control springs 810 return moveable valve elements 111 to the normal position illustrated wherein lips 920 of cups 821 close ports 109. In the event the driver desires to release air from brake motors 122 he can do so by pulling vent control knob 126 whereby cable 125 and member 123-A move valve elements 111 upwardly against the force exerted by valve return compression springs 811. Lips 920 then uncover ports 109 thereby venting brake motors 122 via lines 159, transfer sleeves 701, lines 130, ports 109 and 110 to atmosphere. After motors 122 are vented and the driver releases vent control knob 126, then valve return springs 811 reposition valve elements 111 in the normal position illustrated.

It should further be pointed out that due to the presence of lost motion length 803, FIG. 1, air control means 105 will not be actuated during normal service operation of pedal 30. Hence, ports 109 of air control means 105 are maintained closed by moveable valve elements 111 and prevent auxiliary air from being released, during normal service operation, to transfer sleeve 701 in the systems of FIGS. 1 through 4.

It should be further pointed out that the air control means 105 of FIG. 1 will function with pressures in auxiliary reservoirs 113 less than, equal to, or greater than the existing service air pressure in service reservoirs 150 or 169. It will therefore be understood that transfer sleeve 112 will not be shifted to the right during normal service operation even though the auxiliary air pressure may be greater than the service air pressure. This is true because air control means 105 isolates transfer sleeve 112 from auxiliary reservoir 113 during normal service operation of pedal 30.

Figure 4:
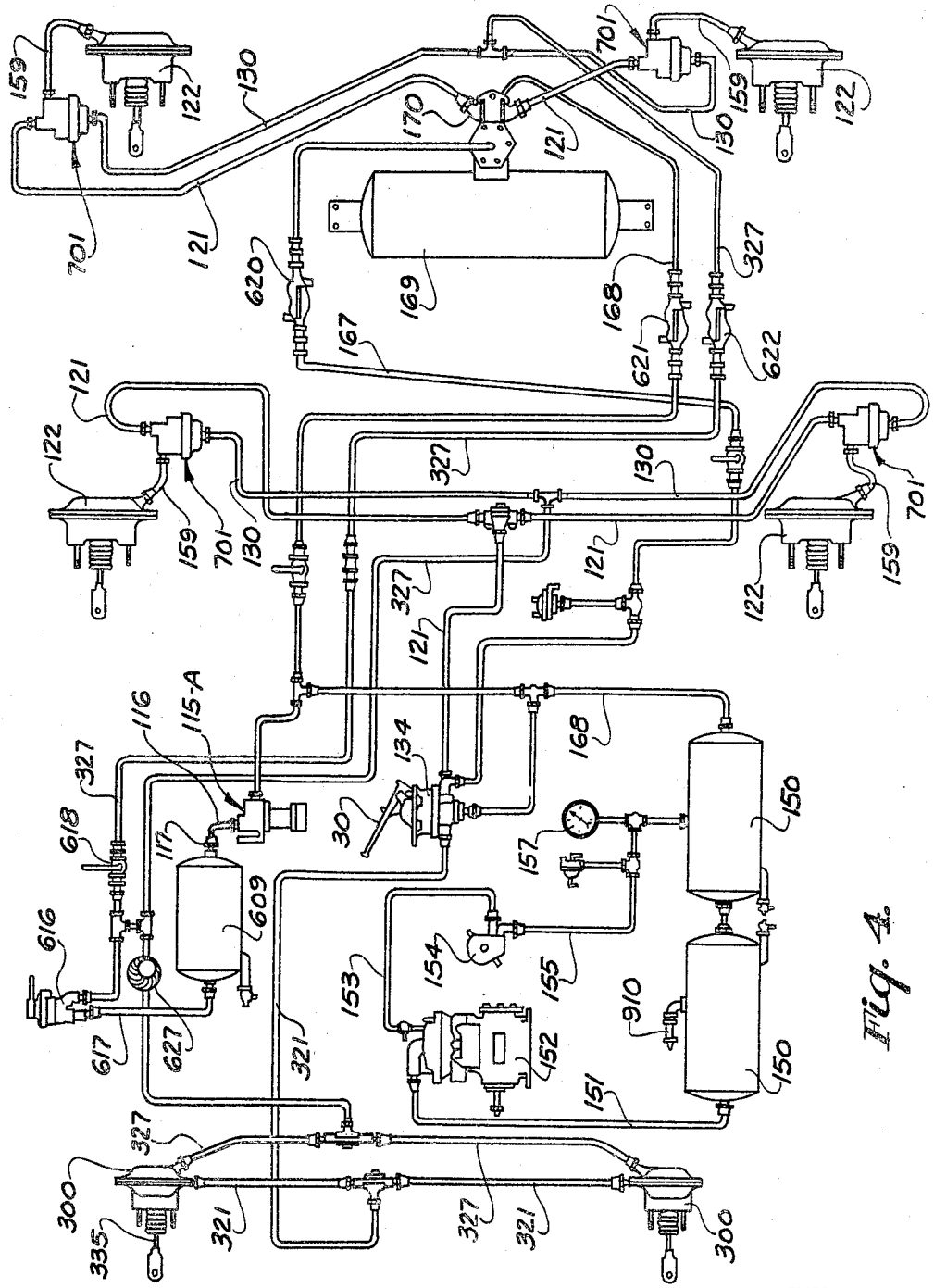
FIGURE 4 is a diagrammatic view of another novel service braking system and auxiliary braking system constructed according to the present invention.

Reference is next made to the air brake system of FIG. 4, which system is adapted for use with the previously described transfer sleeve 701 and differs from the previously described system of FIGS. 1 through 2 in that actuation of the auxiliary air supply system is accomplished through actuation of a manually operated auxiliary air control valve 616 instead of by actuation of the foot pedal 30 of FIG. 1.

As seen in FIG. 4, a compressor 152 supplies air through line 151 to service reservoir 150. Air from service reservoir 150 passes through line 168 to a pressure regulator valve 115-A to an auxiliary reservoir 609. Such pressure regulator valve 115-A is preferably of the type illustrated in FIG. 2 and described in detail later herein.

When the desired operating pressure is reached in the reservoirs, a governor 154, of a conventional type well known to the art, senses such operating pressure and vents line 153 which in turn operates a valve in the compressor 152 that prevents the compressor 152, which is continuously driven, from continuing to pressurize the reservoirs.

Assuming both reservoirs 150 and 609 are fully charged with air, in the manner previously described, normal braking action is effected by depressing pedal lever 30 which lever actuates brake valve 134 to release air from service reservoir 150 through lines 121 to the various service brake chambers of brake cylinders 122.

Brake valve 134 is of a conventional type, well known to the art, and functions to meter air to the service brake chambers at a controlled rate.

In the event service brake valve 134 is actuated, with a failure in pressure availability in the service brake circuit, a hand operated brake valve 616 is actuated to release air from auxiliary reservoir 609, through line 617, valve 616, and line 327, lines 130, transfer sleeve 701, and lines 159 to the chambers of air brake cylinders 122.

It will be noted in FIG. 4, that a manually operated shut-off valve 618 is provided in line 327 leading to the brake cylinders of the trailer or trailers being towed by the tractor. Valve 618 is mounted in the cab of the tractor within reach of the driver so that in the event a trailer or trailers should break away from the tractor, and sever the lines between the tractor and trailer, which are shown coupled at 620, 621, and 622, then, in that event the driver can conserve his air supply in auxiliary reservoir 609 by closing the previously mentioned shut-off valve 618.

With continued reference to FIG. 4, the trailer circuit shown to the right of couplings 620, 621, and 622 includes a trailer reservoir 169. Line 168 of the trailer circuit is always charged with reservoir pressure and connects to an emergency relay valve 170, of a conventional type known to the art, which valve feeds air to trailer reservoir 169. Emergency relay valve 170 further serves the function of releasing air through lines 121 to the service chambers of the trailer brake cylinders when the trailer service line is energized by pedal lever 30. In the event of a trailer break-away, emergency relay valve 170 serves the additional function of releasing air from trailer reservoir 169 through line 121, transfer sleeve 701, and lines 159 leading to brake cylinders 122. This results in automatic locking up of the brake motor 122 of the trailer.

In the event of a failure in the trailer service air supply, such as would occur in the event line 168 or coupling 621 are ruptured, and yet the trailer does not break away completely from the tractor such that auxiliary air supply line 327 is still intact, the driver can over-ride a relay emergency operation by manually actuating auxiliary air control valve 616. When the driver institutes such operation of auxiliary air control valve 616 transfer sleeve 701 functions in the same manner previously described for the system of FIGS. 1–3.

As seen in FIG. 4, the line 327 leading to the front axle brake cylinders 122 is provided with front axle limiting valve 627 for proportionally decreasing the air pressure applied to the front brake cylinders when the auxiliary brake system is energized. Pressure limiting valve 627 is located in the cab of the tractor whereby the driver can manually set same to various proportional settings. Hence the driver is able to control the relative braking effect applied at the front axle of the tractor as compared to the braking effect applied at rear axle of the tractor when the emergency hand valve 616 is actuated.

Each of the brake cylinders 122 of FIG. 4 includes a brake actuating rod 335 which is connected to a conventional slack adjustor which in turn operates a conventional camrod that actuates the brake shoes of the vehicle.

Figure 5:
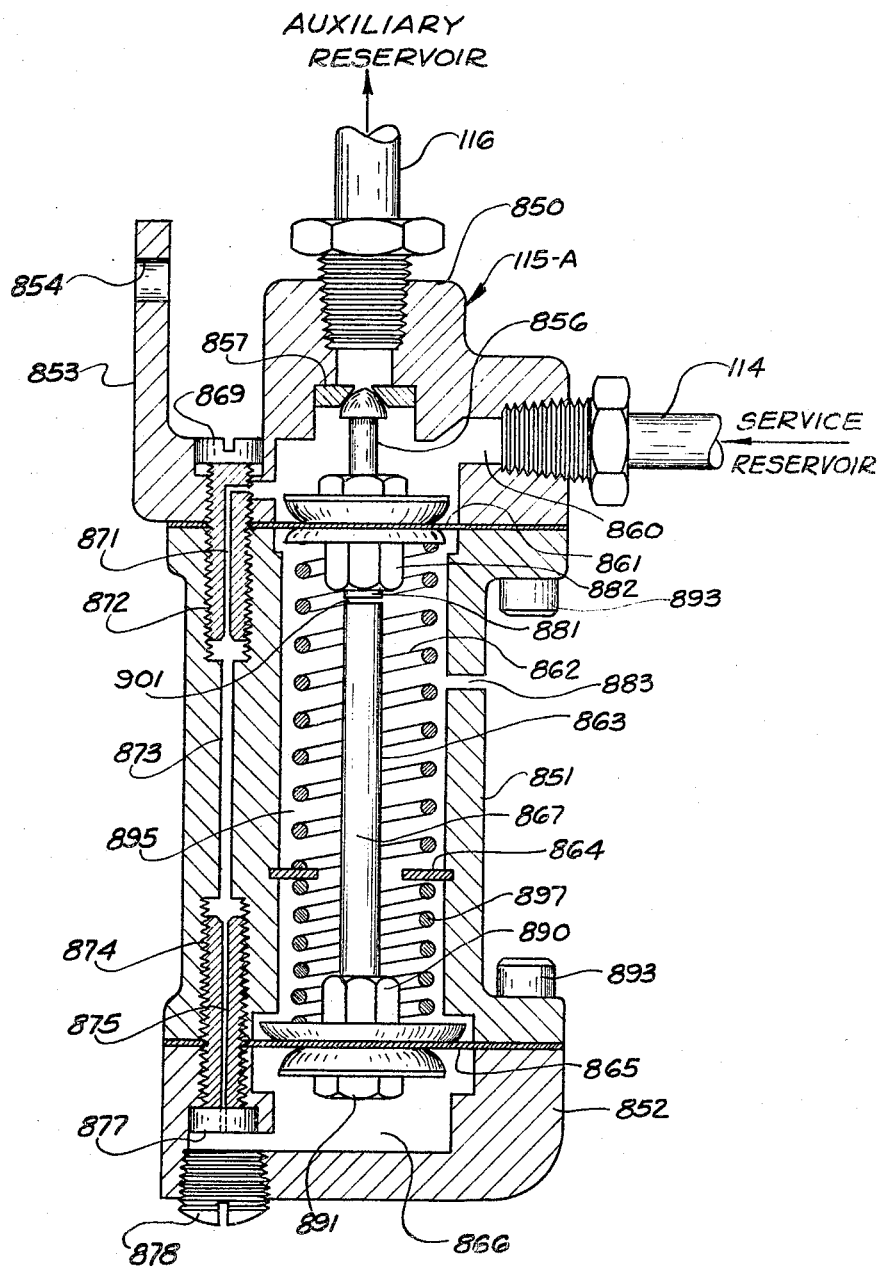
FIGURE 5 is a side sectional view of a novel pressure regulator valve means constructed according to the present invention and comprising a component of the braking system of FIGS. 1 and 2 and the braking system of FIG. 4.

Reference is next made to FIG. 5 which illustrates a novel modified pressure regulator valve 115–A which may be incorporated in the systems of FIGS. 1–3, or the system of FIG. 4, in place of conventional pressure regulator valves commonly known to the art. An example of a conventional pressure regulator is exemplified by the valve illustrated on page 9 P I of the Bendix-Westinghouse Catalog dated October 1955.

With particular reference to FIG. 5, modified pressure regulator valve 115–A includes a line 114 for receiving service air from service reservoirs 150 illustrated in the service air system of FIGS. 2 and 4.

Modified pressure regulator valve 115–A of FIG. 5 also includes a line 116 leading to auxiliary reservoirs 113 of the systems of FIGS. 1–3, or a line 116 leading to auxiliary reservoir 609 of the system of FIG. 4.

Pressure regulator valve 115–A includes an upper casing portion 850, an intermediate portion 851 and a lower casing portion 852. A first flexible diaphragm 861 is mounted between the upper and intermediate casing portions and a lower flexible diaphragm 865 is mounted between the intermediate and lower casing portions. Studs 893 secure the casing portions together with the diaphragms 861 and 865 in clamped relationship between the casing portions. Lower diaphragm 865 carries a rod 867 which has a threaded lower end. Nuts 890 and 891 serve to secure rod 867 to lower diaphragm 865. The upper end of rod 867 is arranged to engage but is separable from threaded pin 881. A nut 882 on pin 881 mounts a moveable valve member 856 to upper diaphragm 861. Valve member 856 is arranged to engage a seat 857 carried by upper casing portion 850.

Intermediate casing portion 851 includes a vertical passage 873 which communicates with a passage 871 in threaded element 869 and with a passage 875 in threaded element 877.

A vent 883 is provided for the chamber 895 between the first and second diaphragms.

An upper compression spring 862 is interposed between upper diaphragm 861 and spring seat 864 and a lower compression spring 897 is interposed between spring seat 864 and lower diaphragm 865.

In operation of modified pressure regulator valve 115–A, it should be pointed out that the area of lower diaphragm 865 is greater than the area of upper diaphragm 861 by some predetermined selected amount, for example, ten percent, whereby the upwardly exerted air force on lower diaphragm 865 is always greater, by ten percent, than the downwardly exerted air force on the upper surface of upper diaphragm 861. This is true because upper chamber 861 is always in communication with lower chamber 866 via passages 871, 873, and 875.

The compression force in upper spring 862 and the compression force in lower spring 897 is arranged by selecting appropriate springs so that diaphragm 861 is normally biased upwardly whereby valve element 856 engages seat 857 and service air is prevented from passing from line 114 to line 116. As the air pressure in upper chamber 860 and lower chamber 866 increases, the net upwardly exerted air force will also increase up to some predetermined selected service air pressure, for example 16 p.s.i. which might be selected as a typical lower operating limit at which pressure regulator valve 115–A opens. It should be pointed out that lower spring 897 is selected so as to exert sufficient compression force to maintain lower diaphragm 865 downwardly during the build-up in service air pressure from zero to 16 p.s.i. Hence the clearance space 901 is maintained between the upper end of rod 867 and pin 881 up to said predetermined service air pressure of 16 p.s.i. As the service air pressure builds up above 16 p.s.i., the net upwardly exerted air force, due to the differential of areas between diaphragms 861 and 865, commences to overcome the force exerted by lower spring 897 and the upper end of rod 867 moves upwardly into engagement with pin 881.

Upon further increase of the service fluid pressure lower spring 897 will be further compressed and, upon reaching some predetermined selected service fluid pressure value, such as 90 p.s.i. which might be selected for an upper operating pressure limit at which pressure regulator valve 115–A opens valve element 856 is caused to engage seat 857 and the auxiliary reservoir is isolated from the service reservoir. For all increases in service fluid pressure, above 90 p.s.i., such isolation will be maintained.

It will be understood that when the pressure in auxiliary reservoirs 113 or 609 decrease below the upper operating pressure limit of pressure regulator 115–A and the service air pressure in chamber 860 is greater than the auxiliary air pressure, then the net upwardly directed air force in pressure regulator 115–A will decrease to a point where the force in spring 897 governs with the result that rod 867 will move downwardly permitting diaphragm 861 to also move downwardly whereby valve 856 is moved away from its seat 857. The mechanism will then function in the manner previously described and build the fluid pressure in the auxiliary reservoir back up to the upper operating pressure limit of 90 p.s.i.

A check valve 117 is provided between pressure regulator 115–A and auxiliary reservoir 609 to prevent loss of the auxiliary fluid in the event line 116, pressure regulator 115–A, or other components of the service system should fail.

It will be understood that by varying the differential in area between diaphragms 861 and 865 and by varying the forces exerted by upper springs 862 and lower springs 897 various predetermined upper and lower operating pressure limits can be readily obtained.

It will be understood that with the novel pressure regulator valve 115–A any failure in the auxiliary air system will not completely drain the service fluid air system since spring 897 in pressure regulator valve 115–A will always close valve 856 at the previously described lower operating pressure limit.

It will further be understood that due to the upper operating pressure limit of pressure regulator valve 115–A the service air system can build up to high pressures without ever increasing the pressure in the auxiliary air system beyond that predetermined upper operating pressure limit. Hence pressure relief valves are not necessary in the auxiliary system. Moreover, in the event pressure relief or blow-off valve 910, FIG. 4, in the service system should freeze in a closed position, concurrently with failure of governor 154 to cut-off compressor 152, then the auxiliary system is isolated by closed valve 856, FIG. 5, from the excessive pressures and possibility of rupture to which the service system is being subjected.

While the forms of embodiments of the present invention as herein disclosed constitute preferred forms, it is to be understood that other forms might be adopted, all coming within the scope of the claims which follow:

I claim:

1. A braking system for a vehicle comprising, in combination, a fluid motor for actuating a braking means at a wheel of said vehicle; service fluid supply means; auxiliary fluid supply means; a controller including a cylinder of small diameter pressurized by fluid from said service air fluid supply means, a cylinder of large diameter communicating with said auxiliary fluid supply means, a valve for controlling said communication, a first passage means for connecting said cylinder of small diameter with said fluid motor and a second passage means for connecting said cylinder of large diameter with said fluid motor; and piston means including a small piston in said cylinder of small diameter and a large piston in said cylinder of large diameter, said large piston being moveable between a first position wherein said large piston closes second passage means and a second position wherein said large piston opens said second passage means, said small piston being movable between a first position wherein said first passage means is open and a second position wherein said small piston closes said first passage means.

2. A braking system for a vehicle comprising, in combination, a fluid motor for actuating a braking means at a wheel of said vehicle; service fluid supply means; auxiliary fluid supply means; a controller including a cylinder of small diameter pressurized by fluid from said service air fluid supply means, a cylinder of large diameter communicating with said auxiliary fluid supply means, a valve for controlling said communication, a first passage means for connecting said cylinder of small diameter with said fluid motor and a second passage means for connecting said cylinder of large diameter with said fluid motor; piston means including a small piston in said cylinder of small diameter and a large piston in said cylinder of large diameter, said large piston being moveable between a first position wherein said large piston closes second passage means and a second position wherein said large piston opens said second passage means, said small piston being movable between a first position wherein said first passage means is open and a second position wherein said small piston closes said first passage means; and resilient means for urging said large piston towards said first position.

3. A braking system for a vehicle comprising, in combination, a fluid motor for actuating a braking means at a wheel of said vehicle; service fluid supply means; auxiliary fluid supply means; a controller including a cylinder of small diameter pressurized by fluid from said service air fluid supply means, a cylinder of large diameter communicating with said auxiliary fluid supply means, a valve for controlling said communication, a first passage means for connecting said cylinder of small diameter with said fluid motor and a second passage means for connecting said cylinder of large diameter with said fluid motor; piston means including a small piston in said cylinder of small diameter and a large piston in said cylinder of large diameter, said large piston being moveable between a first position wherein said large piston closes second passage means and a second position wherein said large piston opens said second passage means, said small piston being movable between a first position wherein said first passage means is open and a second position wherein said small piston closes said first passage means; and a sealing cup including an annular inner surface having ports therein, said large piston including a large portion slideably engaging the inner surface of said cylinder of large diameter and a small portion conforming with the inner surface of said sealing cup for valving off said ports.

4. A braking system for a vehicle comprising, in combination, a fluid motor for actuating a braking means at a wheel of said vehicle; service fluid supply means; auxiliary fluid supply means; a controller including a cylinder of small diameter pressurized by fluid from said service fluid supply means, a cylinder of large diameter communicating with said auxiliary fluid supply means, a valve for controlling said communication, a first passage means for connecting said cylinder of small diameter with said fluid motor and a second passage means for connecting said cylinder of large diameter with said fluid motor; piston means including a small piston in said cylinder of small diameter and a large piston in said cylinder of large diameter, said large piston being moveable between a first position wherein said large piston closes second passage means and a second position wherein said large piston opens said second passage; and a sealing cup having a tapered inner surface with ports therein, said large piston including a large portion slideably engaging the inner surface of said cylinder of large diameter and a small portion having a tapered outer surface conforming with the inner surface of said sealing cup for valving off said ports.

5. A braking system for a tractor-trailer vehicle comprising, in combination, fluid motors for actuating braking means at the wheels of said vehicle; tractor service fluid supply means; trailer fluid supply means; a relay emergency valve controlled by said tractor service fluid supply means including an inlet communicating with said trailer fluid supply means and an outlet; auxiliary fluid supply means; a controller including a cylinder of small diameter communicating with said outlet of said relay emergency valve, a cylinder of large diameter communicating with said auxiliary fluid supply means, a valve for controlling said communication, a first passage means for connecting said cylinder of small diameter with said trailer brake motors and a second passage means for connecting said cylinder of large diameter with said trailer brake motor; and piston means including a small piston in said cylinder of small diameter and a large piston in said cylinder of large diameter, said large piston being moveable between a first position wherein said large piston closes second passage means and a second position wherein said large piston opens said second passage means, said small piston being movable between a first position wherein said first passage means is open and a second position wherein said small piston closes said first passage means.

6. A control valve comprising, in combination, casing means including a large cylinder having an intake port, a small cylinder having an intake port, an outlet port, and passage means connecting said cylinders with said outlet port; piston means including a large piston in said large cylinder and a small piston in said small cylinder, each of said pistons being moveable between a first position wherein it isolates its respective cylinder from said outlet port and a second position wherein said respective cylinder is connected to said outlet port; and a sealing cup including an annular inner surface with ports therein, said large piston including a first piston portion slideably engaging said large cylinder and a second piston portion conforming with the inner surface of said sealing cup for valving off said ports.

7. The apparatus of claim 6 wherein said one piston is urged towards one of said positions by resilient means.

8. The apparatus of claim 6 wherein said casting means forms a chamber between said two pistons and includes a vent between said chamber and the environment.

9. A control valve comprising, in combination, casing means including a large cylinder having an intake port, a small cylinder having an intake port, an outlet port, and passage means connecting said cylinders with said outlet port; piston means including a large piston in said large cylinder and a small piston in said small cylinder, each of said pistons being moveable between a first position wherein it isolates its respective cylinder from said outlet port and a second position wherein said respective cylinder is connected to said outlet port; and a sealing cup including an annular inner surface with ports therein, said large piston including a first piston portion slideably engaging said large cylinder and a second piston portion conforming with the inner surface of said sealing cup for valving off said ports, said casing means including a removable retainer for said sealing cup.

10. The apparatus of claim 9 wherein said first piston portion is of larger diameter than said second piston portion.

11. A control valve comprising, in combination, casing means including a large cylinder having an intake port, a small cylinder having an intake port, an outlet port, and passage means connecting said cylinders with said outlet port; piston means including a large piston in said large cylinder and a small piston in said small cylinder, each of said pistons being movable between a first position wherein said each piston isolates its respective cylinder from said outlet port and a second position wherein said respective cylinder is connected to said outlet port; and a sealing cup including an annular tapered inner surface having ports therein, said large piston including a first piston portion slideably engaging said large cylinder and a second piston portion conforming with the inner surface of said sealing cup at a tapered junction for valving off said ports.

References Cited by the Examiner
UNITED STATES PATENTS

| | | | |
|---|---|---|---|
| 512,233 | 1/1894 | Speed | 303—85 |
| 854,816 | 5/1907 | Farmer | 303—84 X |
| 1,400,670 | 12/1921 | Dudley | 303—63 |
| 1,461,042 | 7/1923 | McWhirter | 303—85 |
| 1,486,939 | 3/1924 | Winter | 303—13 |
| 2,041,884 | 5/1936 | Vorech et al. | 303—13 |
| 2,416,091 | 2/1947 | Fitch | 303—13 X |
| 2,940,551 | 6/1960 | Euga | 188—106 |
| 2,986,426 | 5/1961 | Putnam | 303—84 X |

EUGENE G. BOTZ, *Primary Examiner.*